US011269989B2

(12) United States Patent
Carson

(10) Patent No.: US 11,269,989 B2
(45) Date of Patent: *Mar. 8, 2022

(54) SYSTEMS AND METHODS OF PROTECTING DATA FROM INJECTED MALWARE

(71) Applicant: Digital Guardian LLC, Waltham, MA (US)

(72) Inventor: Dwayne A. Carson, Mendon, MA (US)

(73) Assignee: DIGITAL GUARDIAN LLC, Waltham, MA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/839,550

(22) Filed: Apr. 3, 2020

(65) Prior Publication Data

US 2020/0250300 A1 Aug. 6, 2020

Related U.S. Application Data

(63) Continuation of application No. 15/223,944, filed on Jul. 29, 2016, now Pat. No. 10,614,210.

(60) Provisional application No. 62/199,855, filed on Jul. 31, 2015.

(51) Int. Cl.
*G06F 21/52* (2013.01)
*G06F 21/56* (2013.01)

(52) U.S. Cl.
CPC ............ *G06F 21/52* (2013.01); *G06F 21/566* (2013.01)

(58) Field of Classification Search
CPC ................................ G06F 21/52; G06F 21/566
See application file for complete search history.

(56) References Cited

U.S. PATENT DOCUMENTS

| 7,971,255 | B1 | 6/2011 | Kc et al. | |
| 8,136,158 | B1 | 3/2012 | Sehr et al. | |
| 9,460,284 | B1 * | 10/2016 | Hajmasan | G06F 21/566 |
| 2007/0067844 | A1 * | 3/2007 | Williamson | G06F 21/566 |
| | | | | 726/24 |
| 2009/0199297 | A1 * | 8/2009 | Jarrett | G06F 21/566 |
| | | | | 726/24 |

(Continued)

OTHER PUBLICATIONS

Final Office Action on U.S. Appl. No. 15/223,944 dated Dec. 27, 2018.

(Continued)

*Primary Examiner* — Henry Tsang
(74) *Attorney, Agent, or Firm* — Fredrikson & Byron, P.A.

(57) ABSTRACT

Provided herein are systems and methods for protecting data from injected malware. In some embodiments, a virtual memory validator may execute in user mode memory space on a computing device. The virtual memory validator may monitor an execution stack of an executing thread of a process. The virtual memory validator may identify a memory address referenced in the execution stack, responsive to the process attempting to access a protected resource. The virtual memory validator may determine that the memory address refers to a memory region that is designated as executable. The virtual memory validator may determine that the memory address is outside memory regions identified in a memory range map. The virtual memory validator may, responsive to the determination, identify the process as a potential malware process.

20 Claims, 7 Drawing Sheets

(56) References Cited

U.S. PATENT DOCUMENTS

2009/0288167 A1* 11/2009 Freericks ............. G06F 21/566
  726/23
2013/0290662 A1* 10/2013 Teal ....................... G06F 12/14
  711/163
2014/0181976 A1    6/2014 Snow et al.
2014/0325656 A1* 10/2014 Sallam ................. H04L 63/145
  726/24

OTHER PUBLICATIONS

International Search Report and Written Opinion for PCT/US16/44765 dated Oct. 20, 2016.
Non-Final Office Action on U.S. Appl. No. 15/223,944 dated Jul. 1, 2019.
Non-Final Office Action on U.S. Appl. No. 15/223,944 dated Jul. 25, 2018.
Notice of Allowance on U.S. Appl. No. 15/223,944 dated Feb. 10, 2020.
Notice of Allowance on U.S. Appl. No. 15/223,944 dated Nov. 27, 2019.
Non-Final Office Action on U.S. Appl. No. 16/839,550 dated Jul. 14, 2021.

* cited by examiner

SYSTEMS AND METHODS OF PROTECTING DATA FROM INJECTED MALWARE

RELATED APPLICATIONS

The present application claims the benefit of and priority under 35 U.S.C. § 120 to U.S. patent application Ser. No. 15/223,944, titled "SYSTEMS AND METHODS OF PROTECTING DATA FROM INJECTED MALWARE," filed Jul. 29, 2016, which claims the benefit of and priority under 35 U.S.C. § 119(e) to U.S. Provisional Patent Application No. 62/199,855, titled "SYSTEMS AND METHODS OF PROTECTING DATA FROM INJECTED MALWARE," filed Jul. 31, 2015, each of which are hereby incorporated by reference for all purposes.

FIELD OF THE DISCLOSURE

This disclosure generally relates to systems and methods for controlling access to a resource, including but not limited to systems and methods for protecting data from potential malware by scanning memory allocated to one or more threads of a process.

BACKGROUND OF THE DISCLOSURE

An operating system executing on one or more processors of a computing device may be divided into two execution modes: (1) a user mode and (2) a kernel mode (also referred to as a system mode). An application may include one or more processes. Each process may include one or more threads. Each thread may include one or more subroutines or methods in an execution stack. The operating system may switch which execution mode it is running in depending on the thread. Each application may be initiated in the user mode. In some embodiments, a process in the user mode cannot access memory addresses outside its own allocated memory addresses, such as the kernel or other applications. The kernel may refer to a controller of multiple processes. When a process attempts to access services outside the application, the operating system may switch temporarily to the kernel mode. While in kernel mode, the process can access any memory address, including those outside the memory addresses allocated to the process.

BRIEF SUMMARY OF THE DISCLOSURE

Described herein are systems and methods for protecting data or other resource from potential malware. Malware refers to a variety of forms of hostile or intrusive software, including computer viruses, worms, trojan horses, ransomware, spyware, adware, scareware, and other malicious programs. It can take the form of executable code, scripts, active content, and other software. Embodiments of the present systems and methods can be used to protect data from exfiltration, movement, and/or damage by malware which is injected in a process or otherwise using the process to access the data, whether the process is legitimate or include malware. Illustrative applications for the present systems and methods may include, but not limited to, determining whether to allow access by an executable process to one or more protected resources, such as by checking one or more executable regions allocated by or belonging to one or more executable modules (e.g., dynamic link libraries or executables) of the process. Certain aspects of this disclosure are directed to detecting a process initiated to perform an operation, determining whether the process is allowed to access a protected resource, and determining whether to block access by the process to the protected resource.

In some embodiments, by using a rule system in user mode or kernel mode, a thread of a process may be suspended or temporarily paused, if the system detects that the thread invokes or makes a system call or application programming interface (API) call for accessing a protected resource. Upon determining that the execution thread invokes the call accessing the protected resource, the system may iteratively and/or systematically scan or identify pointers (e.g., memory addresses) in the execution stack of the thread to detect potential malware. Each pointer or memory address may point at or refer to memory marked as executable or data by the operating system. The system may determine whether each of these pointers refers to an executable memory allocation that was instantiated or allocated by, or belongs to a legitimate module of a process, which can be an executable (e.g., EXE, BAT, COM, CMD, etc.) or a dynamic link library (DLL) used or loaded by the process. The legitimate executable may refer to the process itself in some cases, or may refer to an executable within the process.

For example, the system may determine or validate if the executable module is legitimate based on checking a digital signature or a cryptographic hash (e.g., SHA1) of the executable against a whitelist of legitimate executable modules. If the referenced memory does not point to a legitimate executable module, then the system may determine the thread and the entire process to include potential malware. Depending on which determination is made, the thread may then be released from suspension, and an action being attempted by the process (e.g., to access a protected resource) may be blocked or allowed to continue. In some embodiments, the system may display a prompt informing a user of a computing device of the detection of potential malware, and may inquire of the user as to whether to allow the process and/or action to continue, or to allow the process to access the protected resource. The system can thus allow the process to continue running, while blocking certain actions of malicious threads that were injected into the process.

In some aspects, the present disclosure pertains to a method of protecting data or other resources from injected or potential malware. A virtual memory validator may monitor an execution stack of an executing thread of a process initiated to perform an operation. The virtual memory validator may identify a pointer or memory address referenced in the execution stack. The virtual memory validator may determine whether the memory address refers to a memory region that is designated as executable, and that is identified in a memory range map. The memory range map may include one or more ranges of memory addresses allocated by or belonging to known or legitimate executable modules. Responsive to determining that the memory address is outside memory regions identified in the memory range map, the virtual memory validator may determine and/or set the process as being or comprising a potential malware process.

Responsive to determining that the memory address refers to or is within a memory region identified in the memory range map, the virtual memory validator may determine that the corresponding pointer, stack and/or thread is associated with an executable module that is legitimate. Responsive to determining that the memory address refers to or is within a memory region identified in the memory range map, the virtual memory validator may set, identify and/or handle the process as a potential malware process. Responsive to determining that the memory address refers to executable memory of that of a validated executable module, the virtual memory validator may determine whether another pointer or memory address can be identified from the execution stack. Responsive to determining that no other pointer or memory address is associated with the execution stack, or that all other pointer(s) or memory address(es) corresponds to that of one or more validated executable modules, the virtual memory validator may set, identify and/or handle the associated process as a legitimate process.

In some aspects, the present disclosure pertains to a system for protecting data from injected or potential malware. The virtual memory validator may monitor an execution stack of an executing thread of a process initiated to perform an operation. The virtual memory validator may identify a pointer or memory address associated with the execution stack. The virtual memory validator may determine whether the memory address is within a validated memory region/ranges identified in a memory range map. The memory range map may include one or more ranges of memory addresses validated as belonging to legitimate executable modules. Responsive to determining that the pointer or memory address is outside the memory regions/ranges in the memory range map, the virtual memory validator may set, identify and/or handle the process as a potential malware process. In some embodiments, responsive to determining that the memory address refers to, or is within a memory region identified in the memory range map, the virtual memory validator may determine whether the identified memory region is allocated by or belongs to a validated executable module. Responsive to determining that the identified memory region does not correspond to that of a validated executable module, the virtual memory validator may set or handle the corresponding process as a potential malware process. Responsive to determining that the memory region corresponds to that of a validated executable module, the virtual memory validator may determine whether there are one or more other memory addresses referenced in the execution stack. Responsive to determining no other pointer or memory address from the execution stack, or that all other pointer(s) or memory address(es) corresponds to executable memory regions of one or more legitimate executable modules, the virtual memory validator may set, identify and/or handle the corresponding process as a legitimate process.

In some aspects, the present disclosure pertains to a method of detecting injected malware. A virtual memory validator may execute in user mode memory space on a computing device. The virtual memory validator may monitor an execution stack of an executing thread of a process. The virtual memory validator may identify a memory address referenced in the execution stack, responsive to the process attempting to access a protected resource. The virtual memory validator may determine that the memory address refers to a memory region that is designated as executable. The virtual memory validator may determine that the memory address is outside memory regions identified in a memory range map. The virtual memory validator may, responsive to the determination, identify the process as a potential malware process.

In some embodiments, the virtual memory validator may receive, from an action examiner operating in a kernel mode memory space on the computing device, a request to determine whether the process comprises a potential malware process. In some embodiments, the computing device may inject the virtual memory validator as a thread or executable module into the process. In some embodiments, the virtual memory validator may traverse the execution stack of the executing thread to identify each memory address referenced in the execution stack.

In some embodiments, monitoring the execution stack may include monitoring the execution stack of the executing thread. The executing thread may execute in user mode memory space on the computing device. In some embodiments, an action examiner may operate on a kernel mode memory space on the computing device. The action examiner may check the process against a list of approved processes, responsive to the process attempting to access the protected resource.

In some embodiments, the virtual memory validator may determine a second memory address referenced in the execution stack refers to a memory region identified in the memory range map. The virtual memory validator may determine whether the identified memory region belongs to a legitimate executable module. In some embodiments, determining that the second memory address refers to a memory region identified in the memory range map may further include determining that the identified in the memory range map is designated as executable.

In some embodiments, the virtual memory validator may identify that second memory address referenced in the execution stack points to an executable module. The virtual memory validator may determine whether the executable module comprises a legitimate executable module. In some embodiments, the method may include suspending according to a rule engine of an action examiner, the executing thread responsive to identifying that the process is a potential malware process.

In some aspects, the present disclosure pertains to a system for detecting injected malware. The system may include memory space on a computing device. The memory space may include user mode memory space and kernel mode memory space. A virtual memory validator may execute in the user mode memory space. The virtual memory validator may monitor an execution stack of an executing thread of a process. The virtual memory validator may identify a memory address referenced in the execution stack, responsive to the process attempting to access a protected resource. The virtual memory validator may determine that the memory address refers to a memory region that is designated as executable. The virtual memory validator may determine that the memory address is outside memory regions identified in a memory range map. The virtual memory validator may identify, responsive to the determination, the process as a potential malware process. In some embodiments, the virtual memory validator may receive, from an action examiner operating in the kernel mode memory space, a request to determine whether the process comprises a potential malware process. In some embodiments, the system may include an action examiner. The action examiner may operate in the kernel mode memory space. The action examiner may inject the virtual memory validator as a thread or executable module into the process.

In some embodiments, the virtual memory validator may traverse the execution stack of the executing thread to identify each memory address referenced in the execution stack. In some embodiments, the executing thread may execute in user mode memory space on the computing device. In some embodiments, the system may include an action examiner. The action examiner may operate in the kernel mode memory space. The action examiner may check the process against a list of approved processes, responsive to the process attempting to access the protected resource.

In some embodiments, the virtual memory validator may determine that a second memory address referenced in the execution stack refers to a memory region identified in the memory range map. In some embodiments, the virtual memory validator may determine whether the identified memory region belongs to a legitimate executable module. In some embodiments, the virtual memory validator may determine that a second memory address referenced in the execution stack refers to a memory region that is designated as executable and identified in the memory range map. The virtual memory validator may determine whether the identified memory region belongs to a legitimate executable module.

In some embodiments, the virtual memory validator may identify that second memory address referenced in the execution stack points to an executable module. In some embodiments, the virtual memory validator may determine whether the executable module comprises a legitimate executable module. In some embodiments, the system may include an action examiner. The action examiner may operate in the kernel mode memory space. The action examiner may have a rule engine. The rule engine may suspend the executing thread responsive to identifying that the process is a potential malware process.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
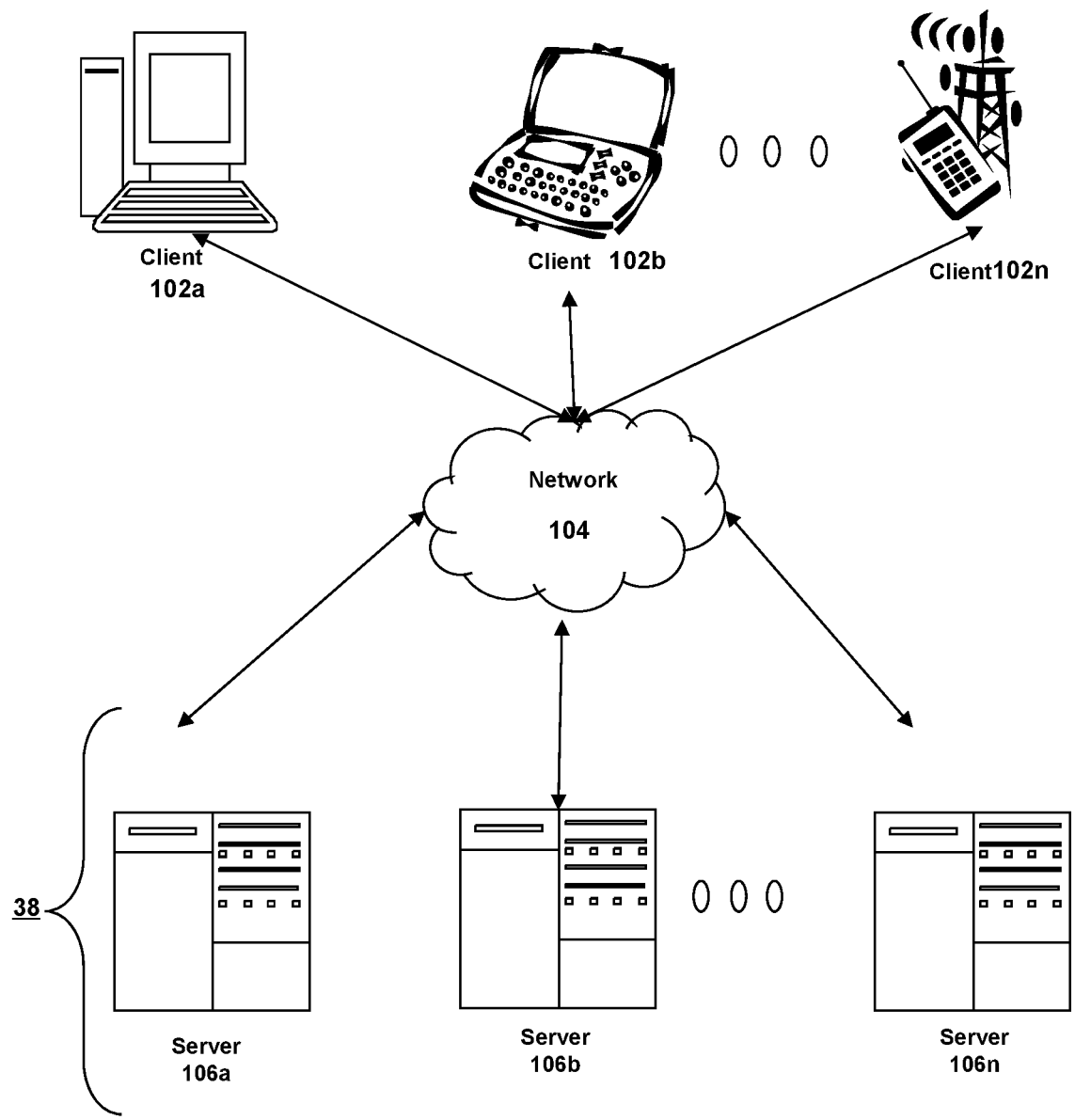
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for protecting data or other resources from potential malware.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual memories that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 106b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
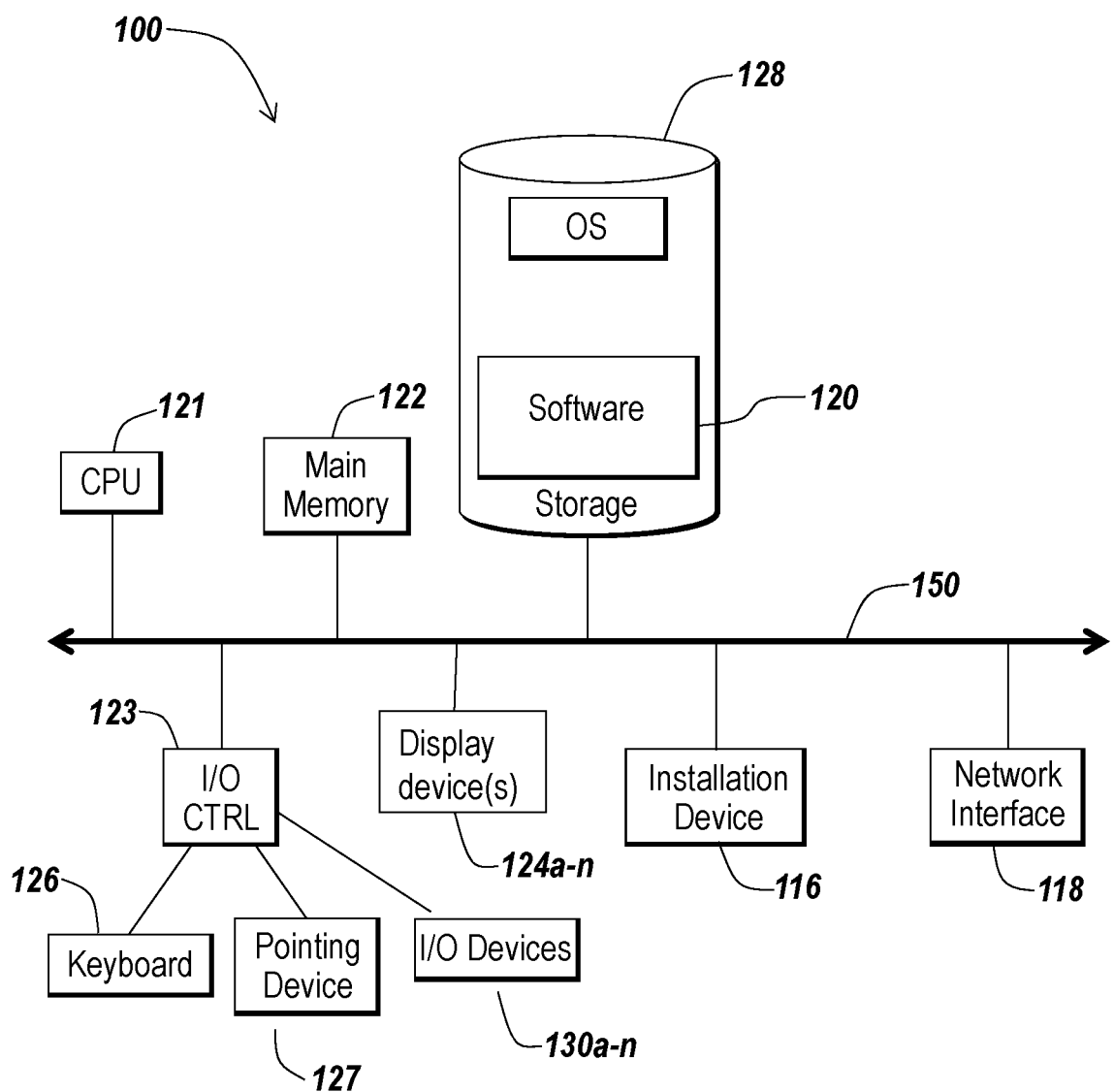
FIGS. 1B and 1C are block diagrams depicting embodiments of computing devices useful in connection with the methods and systems described herein.
Figure 1C:
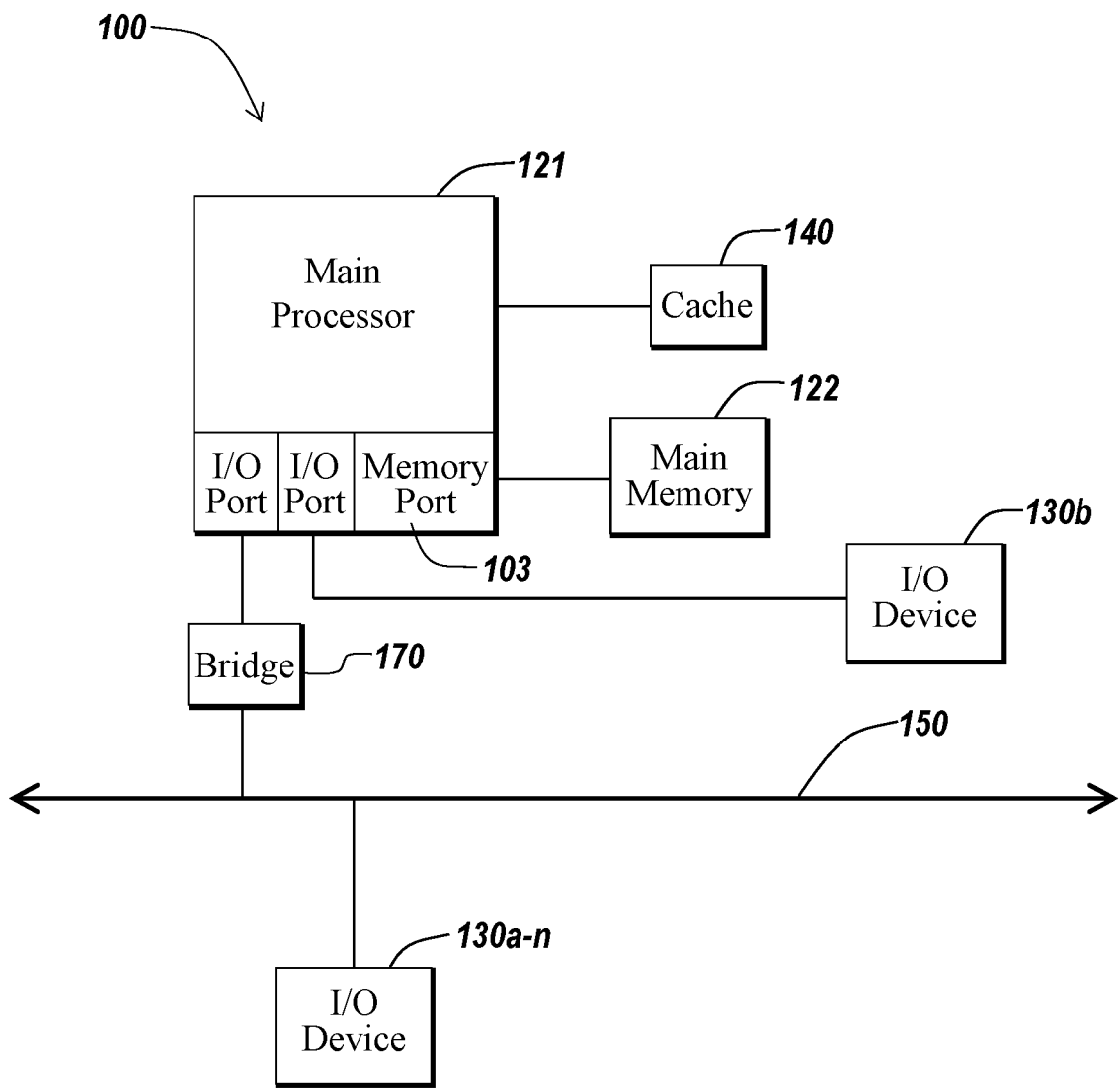

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Protecting Data or Other Resources from Potential Malware

Described herein are systems and methods for protecting data or other resource from potential malware. Malware refers to a variety of forms of hostile or intrusive software, including computer viruses, worms, trojan horses, ransomware, spyware, adware, scareware, and other malicious programs. It can take the form of executable code, scripts, active content, and other software. Embodiments of the present systems and methods can be used to protect data from exfiltration, movement, and/or damage by malware which is injected in a process or otherwise using the process to access the data, whether the process is legitimate or include malware. Illustrative applications for the present systems and methods may include, but not limited to, determining whether to allow access by an executable process to one or more protected resources, such as by checking one or more executable regions allocated by or belonging to one or more executable modules (e.g., dynamic link libraries (DLL's) or executables) of the process. Certain aspects of this disclosure are directed to detecting a process initiated to perform an operation, determining whether the process is allowed to access a protected resource, and determining whether to block access by the process to the protected resource.

By way of illustration and in some embodiments, the present systems and methods may use a memory range map which includes a list of executable regions within a process. The executable regions either legitimately belong to the process, e.g., loaded from an executable (EXE) file of the process, or belong to one or more DLL's (libraries) that the process uses on a normal basis. If malware is present, one or more additional executable regions become present and are potentially referenced by the executing thread, on the thread's execution stack. If those regions are found and do not belong to the process legitimately, then access to the file that the thread is attempting can be blocked. The present system and methods may determine whether to allow or deny access to the protected file by validating executable memory regions referenced by the executing thread.

Each process may have its own memory space, and one or more executable memory regions reside in the process at various points. For illustration purposes, a process, CALC.EXE may be loaded in memory with the following executable modules (.exe or .dll) and corresponding memory regions:

ModLoad: 00007ff6'a3e30000 00007ff6'a3f19000 C:\Windows\system32\calc.exe
ModLoad: 00007ffa'6acc0000 00007ffa'6ae6c000 C:\Windows\SYSTEM32\ntdll.dll
ModLoad: 00007ffa'68f50000 00007ffa'6908e000 C:\Windows\system32\KERNEL32.DLL
ModLoad: 00007ffa'67ef0000 00007ffa'68005000 C:\Windows\system32\KERNELBASE.dll
ModLoad: 00007ffa'69160000 00007ffa'6a679000 C:\Windows\system32\SHELL32.dll
ModLoad: 00007ffa'68da0000 00007ffa'68df4000 C:\Windows\system32\SHLWAPI.dll
ModLoad: 00007ffa'65e40000 00007ffa'65ff0000 C:\Windows\WinSxS\amd64_microsoft.windows.gdiplus_6595b64144ccf1df_1.1.9600.17415_none_932b3b5547500489\gdiplus.dll
ModLoad: 00007ffa'68af0000 00007ffa'68b9a000 C:\Windows\system32\ADVAPI32.dll
ModLoad: 00007ffa'68620000 00007ffa'686e1000 C:\Windows\system32\OLEAUT32.dll
ModLoad: 00007ffa'66b00000 00007ffa'66c29000 C:\Windows\system32\UxTheme.dll
ModLoad: 00007ffa'68c00000 00007ffa'68d94000 C:\Windows\system32\ole32.dll
ModLoad: 00007ffa'660e0000 00007ffa'6635a000 C:\Windows\WinSxS\amd64_microsoft.windows.common-controls_6595b64144ccf1df_6.0.9600.17810_none_6240b9c7ecbd0bda\COMCTL32.dll
ModLoad: 00007ffa'684a0000 00007ffa'68617000 C:\Windows\system32\USER32.dll
ModLoad: 00007ffa'68e00000 00007ffa'68f41000 C:\Windows\system32\RPCRT4.dll
ModLoad: 00007ffa'66360000 00007ffa'66382000 C:\Windows\system32\WINMM.dll
ModLoad: 00007ffa'68350000 00007ffa'684a0000 C:\Windows\system32\GDI32.dll
ModLoad: 00007ffa'69090000 00007ffa'6913a000 C:\Windows\system32\msvcrt.dll
ModLoad: 00007ffa'68760000 00007ffa'68971000 C:\Windows\SYSTEM32\combase.dll
ModLoad: 00007ffa'68990000 00007ffa'689e9000 C:\Windows\SYSTEM32\sechost.dll
ModLoad: 00007ffa'65ff0000 00007ffa'6601a000 C:\Windows\system32\WINMMBASE.dll
ModLoad: 00007ffa'680c0000 00007ffa'6810f000 C:\Windows\SYSTEM32\cfgmgr32.dll
ModLoad: 00007ffa'66ca0000 00007ffa'66cc8000 C:\Windows\system32\DEVOBJ.dll
ModLoad: 00007ffa'68ab0000 00007ffa'68ae6000 C:\Windows\system32\IMM32.DLL
ModLoad: 00007ffa'6a990000 00007ffa'6aae2000 C:\Windows\system32\MSCTF.dll
ModLoad: 00007ffa'66910000 00007ffa'66abe000 C:\Windows\system32\WindowsCodecs.dll
ModLoad: 00007ffa'66040000 00007ffa'66061000 C:\Windows\system32\dwmapi.dll
ModLoad: 00007ffa'66ac0000 00007ffa'66acb000 C:\Windows\SYSTEM32\kernel.appcore.dll
ModLoad: 00007ffa'67d60000 00007ffa'67d6b000 C:\Windows\system32\CRYPTBASE.dll
ModLoad: 00007ffa'67cf0000 00007ffa'67d53000 C:\Windows\system32\bcryptPrimitives.dll
ModLoad: 00007ffa'689f0000 00007ffa'68aa6000 C:\Windows\SYSTEM32\clbcatq.dll
ModLoad: 00007ffa'65c90000 00007ffa'65cfa000 C:\Windows\System32\oleacc.dll There are various executable memory regions owned by or allocated by DLL's loaded into the calc.exe process. These are libraries of executable code that the process calc.exe uses.

Some embodiments of the present systems and methods may, for example, check the process (CALC.EXE) against a list of approved processes when it accesses a classified/protected document. Certain embodiments of the present systems and methods may check an executing thread of the process when an attempt to access a protected resource if detected. For example, when an attempt to access a document occurs, each pointer found on an executing thread's stack in the process is checked to see what executable region, if any, it points to. For the illustrative list of memory regions shown above, if the memory pointer 00007ffa'68990500 is seen on the stack, it would be pointing to "sechost.dll". If sechost.dll is deemed to be legitimate (not a malware component), then the system would not stop access to the file. Other pointers on the stack can be checked the same way. If one pointer points to memory that is executable memory and is not found in the memory range map, the corresponding thread or process is likely to include potential malware and the system can deny access to the protected resource.

There can be some executable regions of memory in a process that do not reside in an EXE or DLL mapped region included in the memory range map. Instead, these may be allocated memory with executable code present. In this case, the owner (or allocator) of such memory regions may be examined, and these executable memory regions can be added to the memory range map with the original allocator as the owner. As such, non-library allocations can be checked via the memory range map when a thread's execution stack pointer is being validated.

In some embodiments, by using a rule system in user mode or kernel mode, a thread of a process may be suspended or temporarily paused, if the system detects that the thread invokes or makes a system call or application programming interface (API) call for accessing a protected resource. Upon determining that the execution thread invokes the call accessing the protected resource, the system may iteratively and/or systematically scan or identify pointers (e.g., memory addresses) in the execution stack of the thread to detect potential malware. Each pointer or memory address may point at or refer to memory marked as executable or data by the operating system. The system may determine whether each of these pointers refers to an executable memory allocation that was instantiated or allocated by, or belongs to a legitimate module of a process, which can be an executable (e.g., EXE, BAT, COM, CMD, etc.) or a dynamic link library (DLL) used or loaded by the process. The legitimate executable may refer to the process itself in some cases, or may refer to an executable within the process.

For example, the system may determine or validate if the executable module is legitimate based on checking a digital signature or a cryptographic hash (e.g., SHA1) of the executable against a whitelist of legitimate executable modules. If the referenced memory does not point to a legitimate executable module, then the system may determine the thread and the entire process to include potential malware. Depending on which determination is made, the thread may then be released from suspension, and an action being attempted by the process (e.g., to access a protected resource) may be blocked or allowed to continue. In some embodiments, the system may display a prompt informing a user of a computing device of the detection of potential malware, and may inquire of the user as to whether to allow the process and/or action to continue, or to allow the process to access the protected resource. The system can thus allow the process to continue running, while blocking certain actions of malicious threads that were injected into the process.

Figure 2A:
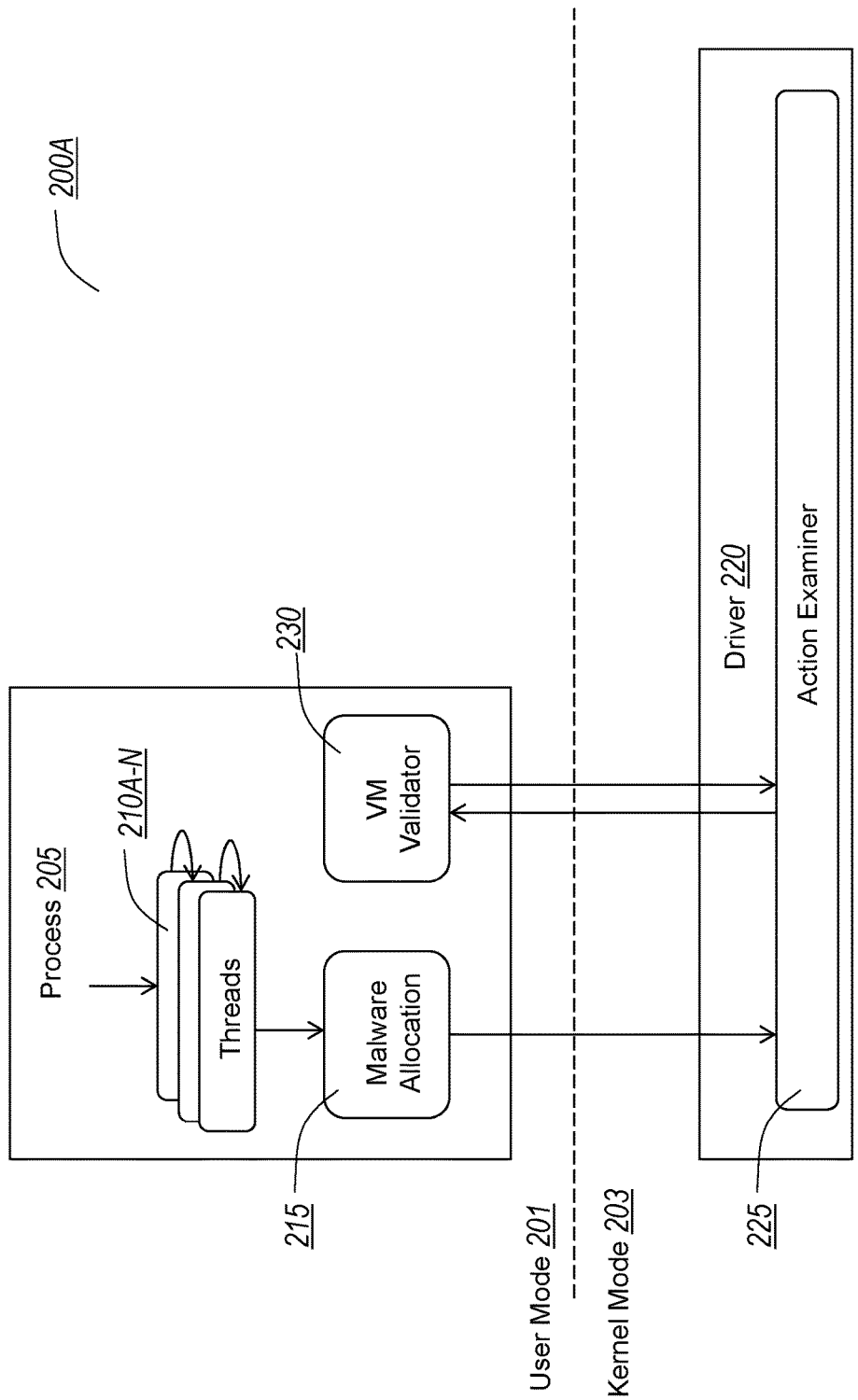
FIGS. 2A and 2B are block diagrams depicting embodiments of a system for protecting data or other resources from potential malware.
Figure 2B:
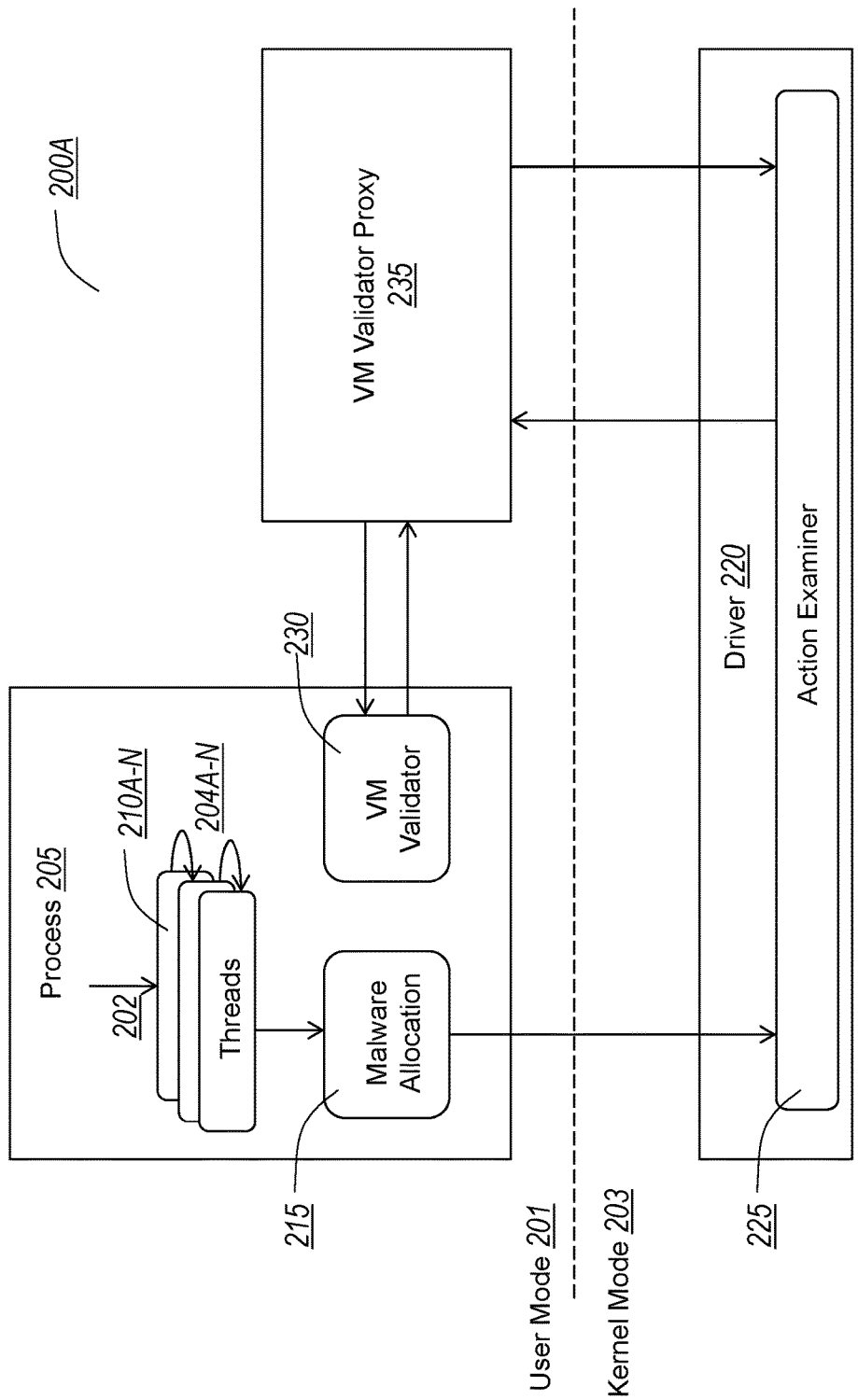

Referring to FIGS. 2A and 2B, two embodiments of a system 200A and 200B for protecting data or other resources from potential malware are depicted. In brief overview, the system 200A may be subdivided or categorized into user mode 201 components and kernel mode 203 components. User mode 201 and kernel mode 203 may refer two distinct execution modes for operating systems running on a central processing unit (CPU). User mode 201 and kernel mode 203 sometimes may refer to user mode memory space and kernel mode memory space respectively. The user mode memory space may include memory addresses allocated or assigned to the processes of the user mode 201. The kernel mode memory space may include memory addresses allocated or assigned to the kernel mode 203. The user mode 201 may be referred to as a non-privileged mode, in which processes cannot access portions of memory that have been allocated to the kernel or to other processes. The kernel may include a controller of multiple processes and processes in the kernel mode 203 can access and control processes running on any memory address. Each process in the user mode 201 may correspond to a portion of the respective execution stack or call stack (e.g., one or more stack frames on the executing stack). The execution stack may be allocated or dedicated to executing threads of processes in the user mode 201.

When a process 205 attempts to access a memory address allocated to the kernel, the operating system may temporarily switch the execution mode of the process 205 to the kernel mode 203 (this process may be referred to as a mode switch). In systems 200A and 200B, the user mode 201 components may include a process 205 that may include one or more threads 210A-N, a malware allocation 215, and a virtual memory validator 230. The kernel mode 203 may be referred to as the privileged mode, in which processes may reference or access any memory, such as data or some other protected resource. In systems 200A and 200B, the kernel mode 203 components may include a driver 220. The driver 220 may include an action examiner 225. The system 200B may also include some or all of the components of system 200A, and may in addition include a virtual memory validator proxy 235.

Each of these components of system 200A and 200B may be controlled by, implemented using, or incorporate features of a computing device, for example as described above in connection with FIGS. 1A-1C. Each component, module, and any sub-module thereof, may include hardware or a combination of hardware and software. For example, a module or submodule may include any application, program, library, script, task, service, process or any type and form of executable instructions executing on any type and form of hardware of the system. In some embodiments, a module or submodule may incorporate one or more processors and/or circuitries configured to perform any of the operations and functions described herein. For example, systems 200A and 200B may run or be executed on one or more processors and memory of a computing system, such as the main processor 121 and main memory 122 of computing device 100.

An application, executable or program (which can include a malware program) may include one or more processes 205. The one or more processes 205 may be initiated and/or executed in user mode 203. When a process 205 is instantiated or initiated, the process may operate in user mode 203 of the operating system. In some embodiments, a process 205 may include one or more threads 210A-N, subprocesses, executable modules, or actions, and may be associated with a malware allocation 215, and may incorporate a virtual memory validator 230 consistent with the present systems and methods. The process 205 may be associated with one or more memory addresses or pointers to allocated memory regions or ranges. The one or more memory addresses may reference the main memory (e.g., main memory 122 of computing device 100), memory-mapped I/O, virtual memory, or any other type of computer memory. The one or more threads 210A-N or executable modules may be associated with (e.g., use, allocate, access, write to, read from, or execute in memory corresponding to) memory regions belonging to the process 205 from time to time.

The process may include a malware allocation 215, which may comprise a memory allocation to an executable module that may be malware. Memory outside the one or more memory regions/ranges allocated to or associated with legitimate executable modules of a process may belong to or are allocated to malware. Malware allocation 215 refers to such memory.

The process 205 may be initiated or otherwise invoked, controlled or used by another process (e.g., by malware via a hook) to perform an operation. For example, even if a process or operation was not started by a malware, the malware may still gain control at some point by having hooked a corresponding application, DLL, or system interface that the process was making use of Thus, a malware can attempt to access a protected data or resource, or use an existing legitimate handle to the data or resource. The process 205 may also be initiated or otherwise invoked (e.g., standalone, not by another process) to perform an operation. In some cases, the process 205 itself may be a potentially malicious process for example in the form of an executable (e.g., EXE, BAT, COM, CMD, etc.).

In this example, the potentially malicious process may access other executables or directly attempt to access protected resources. The potentially malicious process may for example, comprise or be comprised of malware or other malicious or potentially damaging process(es), or comprise or be comprised of a process (e.g., established by a user) that is unknown or yet to be validated by the system. One or more threads 210A-N of execution may be invoked by the process 205 to perform or complete one or more operations. While executing the one or more threads 210A-N, the process 205 may include the malware allocation 215. In some embodiments, the malware allocation 215 may be introduced into the process 205 by, for example, a second process hooked to the first process. For example, at some point during execution of the one or more threads 210A-N, the malware allocation 215 may be established by malware intercepting a function call (also known as "hooking"), an operation, or system interface of the process 205. Once the malware allocation 215 is established, the malware may attempt to directly access a resource or indirectly access the resource by intercepting or using one of the threads 210A-N for example (e.g., hooking a function call).

In some embodiments, the present systems and methods includes a driver 220. The driver 220 may intercept, detect or catch an attempt to access a protected resource. The driver 220 may check this action against one or more validation rules. If the access is, in fact, an attempt to access a protected resource, a rule system or rule engine of the driver may signal the virtual memory validator 230 to verify the current execution thread, or optionally all threads in the corresponding process. The driver 220 may reside or execute in kernel mode 203, and may include an action examiner 225. The action examiner 225 is sometimes referred to as a rule system. The driver 220 may intercept the attempt to access a resource by either the one or more threads 210A-N or the malware allocation 215. The action examiner 225 executing on the driver 220 may verify, check, or otherwise determine whether the resource that the process is attempting to access is a protected resource. The action examiner 225 may detect, examine, determine and/or track one or more actions being attempted by a thread 210A-N and/or in connection with the malware allocation 215. The action examiner 225 may determine that the resource is a protected resource based on one or more validation rules or constraints. The validation rules may, for example, specify memory addresses or ranges that correspond to memory within memory space allocated to a known and/or legitimate process. The action examiner 225 may compare, check, or otherwise verify the process 205 or the thread 210A-N against a list of approved processes. The list of approved processes may include, identify or describe a registry of memory addresses and corresponding validated processes operating in the user mode 203.

Upon determining that the resource is a protected resource, the driver 220 may send a request to the virtual memory validator 230 and/or the virtual memory validator proxy 235 to determine whether the current thread 210A-N and/or malware allocation 215 is potentially malicious in nature. The driver 220 may interact or interoperate with the virtual memory validator 230 and/or the virtual memory validator proxy 235, for example to invoke or send a request to the virtual memory validator 230 and/or the virtual memory validator proxy 235 to determine whether the process 205 includes malware. The virtual memory validator 230 can return a corresponding verification result to the rule system, rule engine, or action examiner 225. Responsive to receiving the verification result, the rule engine or rule system may return a block result for the access attempt. Alternatively, the rule system may use or invoke a user interface or message to prompt a user to determine if the access should be allowed or not.

The virtual memory validator 230 may validate one or more memory addresses and/or memory regions referenced by execution stacks of the one or more threads 210A-N. The virtual memory validator 230 may be injected (e.g., by the operating system or the action examiner 225) as a thread or executable module (e.g., a user mode executable and/or DLL) into the process 205, for example by intercepting function calls (or "hooking") using, for example, any number of DLL injection techniques. The virtual memory validator 230 may generate, update and/or access a memory range map. In some embodiments, the present system and/or the OS generate and/or maintain the memory range map. The virtual memory validator 230 in kernel mode may identify legitimate memory ranges 203 for the memory range map. In some embodiments, the virtual memory validator 230 may identify the memory addresses referenced or pointed to by a process environmental block (PEB) of the process 205 for the one or more threads 210A-N or executable modules that are loaded.

In some embodiments, the virtual memory validator 230 may traverse, trace or check the execution stack owned by the executing thread. The virtual memory validator 230 may identify one or more pointers or memory addresses, found in the execution stack, as corresponding to executable memory allocated by or belonging to a validated executable module. The virtual memory validator 230 may check whether the one or more pointers or memory addresses, referring to executable memory, is within a memory region/range identified by the memory range map. For example, the virtual memory validator 230 may identify a memory region or range from those specified in the memory range map for known executable modules. Each entry or index of the memory range map may include: a start address of a memory range, end address of the memory range, map entry type, path entry of the executable, validation indicator/Boolean, and/or an entry checked indicator/Boolean. The map entry type may include executable information (e.g., file signature) or virtual memory information. The path entry of the executable may include a path where the executable was loaded from (e.g., hooked function call) and/or a path where a virtual protection function was loaded from. The virtual protection function may be a function that changes the access protection of the memory addresses associated with the process 205.

The validation indicator/Boolean may indicate whether the memory address ranging from the start address to the end address corresponds to a validated memory region/range belonging to a legitimate executable module. The validation indicator/Boolean may indicate whether the memory address ranging from the start address to the end address corresponds to a validated memory region/range that is designated to be executable (e.g., rather than "data"). Not every memory region on the memory range map may be validated as a validated memory region. The entry checked indicator may indicate whether the respective entry and/or index of the memory range map has been checked.

The virtual memory validator 230 may determine whether the process 205 includes a potentially malicious module based on memory address(es), if any, referenced by the one or more threads 210A-N. The virtual memory validator 230 may determine whether the one or more threads 210A-N and/or the malware allocation 215 is legitimate. In some embodiments, the virtual memory validator 230 may start, initiate or instantiate one or more separate threads to determine whether each entry in the memory range map is legitimate, allowed, known, validated and/or registered. For example, the virtual memory validator 230 may traverse some or all the entries in the memory range map. The virtual memory validator 230 may use information about one or more of these threads to process each map entry of the memory range map, and/or to validate the corresponding executable module (e.g., DLL/EXE) where a corresponding DLL/EXE path points. For instance, if a signature of a DLL/EXE is validated, the corresponding validation indicator/Boolean may be set to true. In some cases, a hash of the DLL/EXE may be used for validation against a whitelist of known good DLL/EXE's. In some embodiments, any time an entry is checked by the virtual memory validator 230 to verify the entry's signature or a hash of the corresponding DLL/EXE is performed and checked against a known good list, a corresponding entry checked indicator/Boolean may be set to true. This entry may not need to be checked again, in some embodiments. Upon determining that at least one entry is not legitimate, the virtual memory validator 230 may set or treat the corresponding process 205 as not legitimate and as comprising potential malware.

The virtual memory validator 230 may validate the path entry of the executable module or the map entry type based on the signature of the executable associated with the process 205. The signature of the executable module may include metadata of the executable module, for example, a file header and/or file magic number of the executable module, among other identifiers. The signature of the executable module may be, for example, a unique alphanumerical identifier used to identify a file format or protocol. The virtual memory validator 230 may compare a signature of the executable module against the path entry of the executable module on the memory range map. If the path entry of the memory range map matches the signature of the executable module, the virtual memory validator 230 may determine that the respective thread 210A-N is legitimate. If the map of the memory range map entry does not match the signature of the executable module, the virtual memory validator 230 may determine that the respective thread 210A-N and/or the malware allocation 215 is not legitimate or known, and determine that the process 205 contains potential malware. Once the entry of the memory range map is checked, the virtual memory validator 230 may set the entry checked indicator to, for example, "true," indicating that the respective entry was checked. The virtual memory validator 230 may also determine whether the process 205 includes a malicious thread according to the methods described in connection with FIGS. 3 and/or 4.

In some embodiments, the virtual memory validator 230 may include or establish an executable load indicator (sometimes referred to as a DLL load indicator) and/or an executable unload indicator (sometimes referred to as a DLL unload indicator). The virtual memory validator 230 may establish the executable load indicator and/or an executable unload indicator upon injection or loading into the process. The executable load indicator may be established as a callback mechanism to keep track of one or more function calls of the one or more threads 210A-N and/or malware allocation 215 of the process 205. The virtual memory validator 230 may establish the callback mechanism (e.g., by hooking an existing function in the process) such that the virtual memory validator 230 may be notified of any executable or DLL being loaded in the process. In some embodiments, establishing this callback mechanism may be optional. In some embodiments, the virtual memory validator 230 may poll for changes to the currently loaded DLL list, for example in place of using this callback mechanism. For example, the virtual memory validator 230 may identify the number of changes to the loaded DLL list or percentage of DLLs changed on the loaded DLL list.

The executable load indicator may also keep track of thread(s) loaded during the executing of the one or more threads 210A-N and/or any malware allocation 215 in the process 205 based on the callback mechanism. The executable load indicator may determine whether a range of memory addresses of the loaded thread corresponds to a start address of the memory range and/or an end address of the memory range within the memory range map for the process 205. Responsive to determining that the range of memory addresses of the loaded thread does not correspond to the start address of the memory range and/or the end address of the memory range within the memory range map for the process 205, the executable load indicator may generate an entry in the memory range map for each of the function calls of the one or more threads 210A-N of the process 205. Once the thread is loaded, the virtual memory validator 230 may determine whether the loaded thread is legitimate. When the executable load indicator is called, a new map entry may be established by the system in the memory range map for the loaded thread or DLL (e.g., if one is not already present with the DLL's same start address and end address), and the virtual memory validator 230 may proceed to validate the loaded DLL, setting the corresponding validation indicator/Boolean appropriately.

The executable unload indicator may keep track of one or more threads unloaded during the executing of the one or more threads 210A-N of the process 205 based on the callback mechanism. Responsive to identifying that a thread has been unloaded, the executable unload indicator may remove the entry in the memory range map corresponding to the unloaded thread. When the executable unload indicator is called, an entry in the memory range map (if any) that corresponds to the unloaded thread or DLL is removed (e.g., by the system and/or the OS) from the map.

The virtual memory validator 230 may search a process environmental block (PEB) of the process (or similar data structure that lists currently loaded DLLs in the process). In some embodiments, the virtual memory validator 230 may acquire knowledge of loaded DLL's via an API. For each DLL that is currently loaded, an entry may be placed or added (e.g., by the driver, VM validator and/or the OS) into the memory range map as described herein.

In some embodiments, the virtual memory validator 230 may use a virtual protect function to access, set or change a protection type for a range of memory addresses based on whether the range of memory addresses is associated with an executable or a protected resource. The virtual protection function is sometimes referred to as a NtVirtualProtect function, and may comprise a function that controls, manages and/or changes the access protection type of the memory addresses associated with the process 205 (e.g., marking the memory as "executable" or "data" memory). This hook or API to the virtual protect function can be used to ensure that the virtual memory validator 230 knows when an area of process memory is being marked as "executable" memory. This hook is sometimes referred to as the virtual protect hook. In some embodiments, establishing this hook is optional, but may provide for better accuracy. When the virtual protection API or hook is called to mark a region of memory as "executable", the virtual memory validator 230 may check the identity of the caller. The caller should correspond to a thread or DLL, or to the main executable module (which is considered the owner of the memory region), which may already be in a whitelist. If the owner is determined, an entry may be placed in the memory range map that represents this region, and a corresponding map entry type may be set as "Virtual Memory".

The protection type (e.g., for a range of memory addresses) may specify whether the virtual memory validator 230 may set the validation indicator/Boolean for the respective entry in the memory range map as validated based on whether the range of memory addresses is associated with a validated executable module. The virtual memory validator 230 may specify or identify a range of memory addresses as being dedicated to an executable module. Using the protection type, if any of the threads 210A-N and/or malware allocation 215 of the process 205 refer to one or more memory addresses belonging to or allocated by an executable module, the virtual memory validator 230 may identify which one of the one or more threads 210A-N made the call referring to the memory address dedicated for the executable.

Responsive to identifying which one of the one or more threads 210A-N made the call, the virtual memory validator 230 may set a map entry type field in the respective entry in the memory range map as virtual memory. The virtual memory validator 230 may also set the validation indicator as validated and/or the entry checked indicator as checked. In some embodiments, the validation indicator may comprise a Boolean indicator, which may be initialized and/or defaulted to "false" for example.

In some embodiments, the system include a virtual memory validator proxy or executable (EXE) 235. The virtual memory validator proxy 235 may be included to communicate to one or more virtual memory validators (e.g., injected VM validator DLLs) in one or more (e.g., other) processes. The virtual memory validator proxy 235 may call a virtual memory validator 230, and/or receive a call from a virtual memory validator 230, e.g., as depicted in FIG. 2B. The virtual memory validator proxy 235 may execute in user mode, separate from (e.g., not injected into) the process 205. The virtual memory validator proxy 235 may identify the memory address referenced by the one or more threads 210A-N and/or malware allocation 125. The virtual memory validator proxy 235 may have the same or similar functionalities as the virtual memory validator 230. In some embodiments, the virtual memory validator proxy 235 may be used to communicate to the injected virtual memory validator 230. In some embodiments, the virtual memory validator proxy 235 provides additional functionality, such as providing prompting (for user interaction) in user mode. The virtual memory validator proxy 235 can be used to display information to a user and possibly request the user's input. The virtual memory validator proxy 235 may include an Inter-Process Communications (IPC) mechanism in place that can allow it to send information to and receive information from one or more VM Validator DLLs in one or more processes. In some embodiments, alternatively, the virtual memory validator proxy 235 can initiate or invoke a separate executable that has the IPC mechanism to communicate to the VM validator DLLs.

Responsive to determining that the process 205 may potentially have been injected with a malicious thread, such as via the malware allocation 215, the virtual memory validator proxy 235 may read from or access a user mode accessible database of whitelisted executables or DLLs. The virtual memory validator proxy 235 may determine whether the process 205 flagged as potentially containing malware is legitimate, known, registered, authorized or validated further based on the database of whitelisted executables. The virtual memory validator proxy 235 may also perform hashing, or verify file signatures and/or functional modules/threads of a process 205, to determine whether the one or more modules/threads 210A-N of the process 205 is legitimate, known, registered, authorized or validated.

Figure 3:
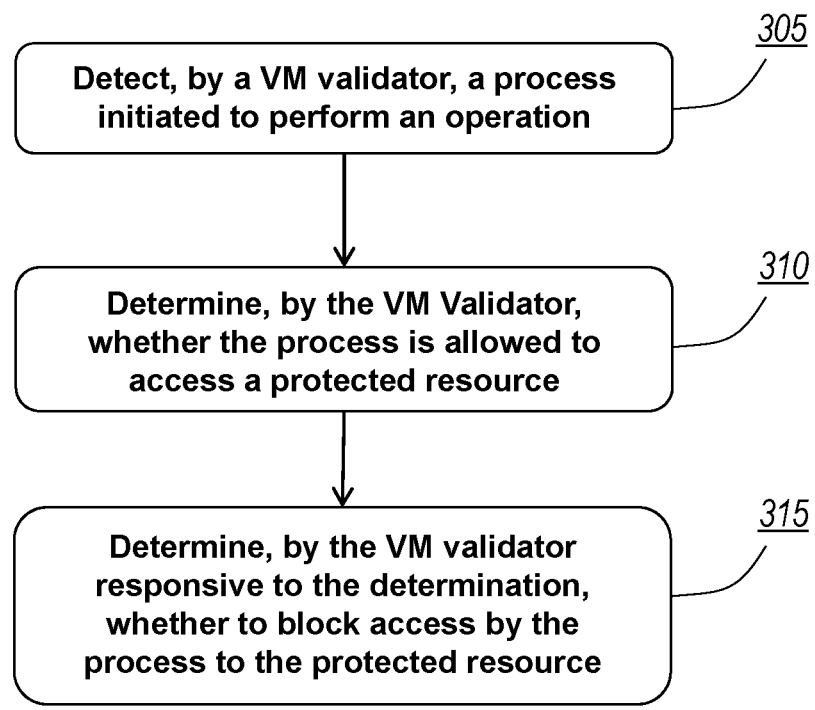
FIG. 3 is an illustrative embodiment of a flow diagram of protecting data or other resources from potential malware.

Referring to FIG. 3, a flow diagram or method 300 for protecting data or other resources from potential injected malware according to an illustrative embodiment is depicted. The method 300 can be performed or executed by the virtual memory (VM) validator 230 and/or the virtual memory validator proxy 235, and/or any one or more components of system 200A or 200B. For example, the method 300 can be executed by the virtual memory validator 230, responsive to receiving a request from the action examiner 225 of the driver 220. In brief overview, the method may include detecting a process initiated to perform an operation (step 305). The method may include determining whether the process is allowed to access a protected resource (step 310). The method may include determining, responsive to determining whether the process is allowed to access a protected resource, whether to block access by the process to the protected resource (step 315).

Referring to step 305, and in more details, the method 300 may include detecting, by the virtual memory validator, a process initiated to perform an operation. For example, upon the instantiation of an application, the virtual memory validator 230 may detect a process 205 associated with the application initiated to perform the operation. The application may include one or more processes. The virtual memory validator 230 may be injected (e.g., as a DLL) by the system and/or OS into the process, e.g., upon initialization of the process. The virtual memory validator 230 may communicate with (e.g., be called by) a virtual memory validator proxy 235 executed independently from the process 205. The virtual memory validator 230 may also communicate with (e.g., be called by) the action examiner 225 operating in the kernel mode memory space on the computing device.

The virtual memory validator 230 may detect one or more processes 205 or the one or more threads 210A-N executing or being initiated in user mode 203. The virtual memory validator 230 may identify, analyze, monitor and/or track one or more executing threads (e.g., the executing thread 210A-N and the malware allocation 215) of the one or more processes. The virtual memory validator 230 may monitor the execution stack for the executing thread 210A-N of the process 205. Each process 205 may include one or more threads 210A-N. Each process 205 may also include a malware allocation 215 associated therein, as discussed above in connection with at least FIGS. 2A and 2B. Each process 205 and each of the executing threads 210A-N may correspond to a portion (e.g., one or more stack frames) on the execution stack. The execution stack for the process 205 or the executing thread may reference one or more memory addresses.

The virtual memory validator 230 may identify a memory address that the process 205 or the execution thread 210A-N is attempting to access. The virtual memory validator 230 may determine whether the process 205 is attempting to access a protected resource (e.g., memory addresses not assigned to the process 205 or the individual execution thread). The virtual memory validator 230 may identify the memory address referenced in the execution stack, responsive to the process attempting to access the protected resource. The virtual memory validator 230 may identify the one or more stack frames corresponding to the process 205 or the executing thread. The virtual memory validator 230 may identify memory address(es) associated with or referenced in the one or more identified stack frames of the execution stack. The virtual memory validator 230 may traverse the one or more stack frames of the execution stack for the executing thread to identify each memory address referenced in the execution stack. The virtual memory validator 230 may identify the memory address(es) referenced in the execution stack. At least one of the stack frames of the execution stack may reference or point to an executable module.

Referring to step 310, and in more details, the method 300 may include determining, by the virtual memory validator, whether the process is allowed to access a protected resource. For example, the virtual memory validator 230 may determine whether the one or more threads 210A-N and/or malware allocation 215 of the process 205 is used to access a protected resource. Responsive to determining that the one or more threads 210A-N is attempting to access a protected resource, the virtual memory validator 230 and/or the virtual memory validator proxy 235 may identify the memory addresses referenced by the one or more threads 210A-N or malware allocation 215. The virtual memory validator 230 may receive a request to determine whether the process 205 comprises a potential malware process (e.g., malware allocation 215) from the action examiner 225, responsive to the action examiner 225 detecting that the process 205 or the executing thread 210A-N is attempting to access a memory address outside the memory region allocated to the process 205 or the executing thread 210A-N. The virtual memory validator 230 may signal or relay a request to the action examiner 225 for the action examiner 225 to compare, check, or otherwise verify the process 205 or the executing thread 210A-N against a list of approved processes, a validation rule and/or constraints. The validation rules may, for example, specify memory addresses or ranges that correspond to memory within memory space allocated to a known and/or legitimate process. The action examiner 225 may compare, check, or otherwise verify the process 205 or the thread 210A-N against a list of approved processes. The list of approved process may include a registry of memory addresses and corresponding validated processes operating in the user mode 203.

The virtual memory validator 230 may determine that the memory address, identified as corresponding to one or more threads 210A-N and/or malware allocation 215 of the process 205, references, points to, or otherwise belongs to a memory region/range designated as executable. The memory region/range designated as executable may correspond to one or more memory addresses belonging to legitimate processes or legitimate executable modules in the user mode 201 and/or the kernel mode 203. The virtual memory validator 230 may determine whether the executable module referenced or pointed by the execution stack includes a legitimate executable module. For example, the virtual memory validator 230 may identify or determine a memory range map associated with the process 205. The virtual memory validator 230 may determine that the memory address is outside the memory regions identified in the memory range map. A memory address outside the memory regions of the memory range map may indicate that the corresponding process 205 or the executing thread 210A-N is a potential malware process or allocation. The virtual memory validator 230 may compare the memory range map with the memory addresses referenced by the one or more threads 210A-N. If any of the memory addresses referenced is not included within a memory region/range identified in the memory range map and/or does not correspond to those of a validated process (e.g., process 205 and the threads 210A-N), the virtual memory validator 230 may determine that the process 205 includes potential malware.

Figure 4:
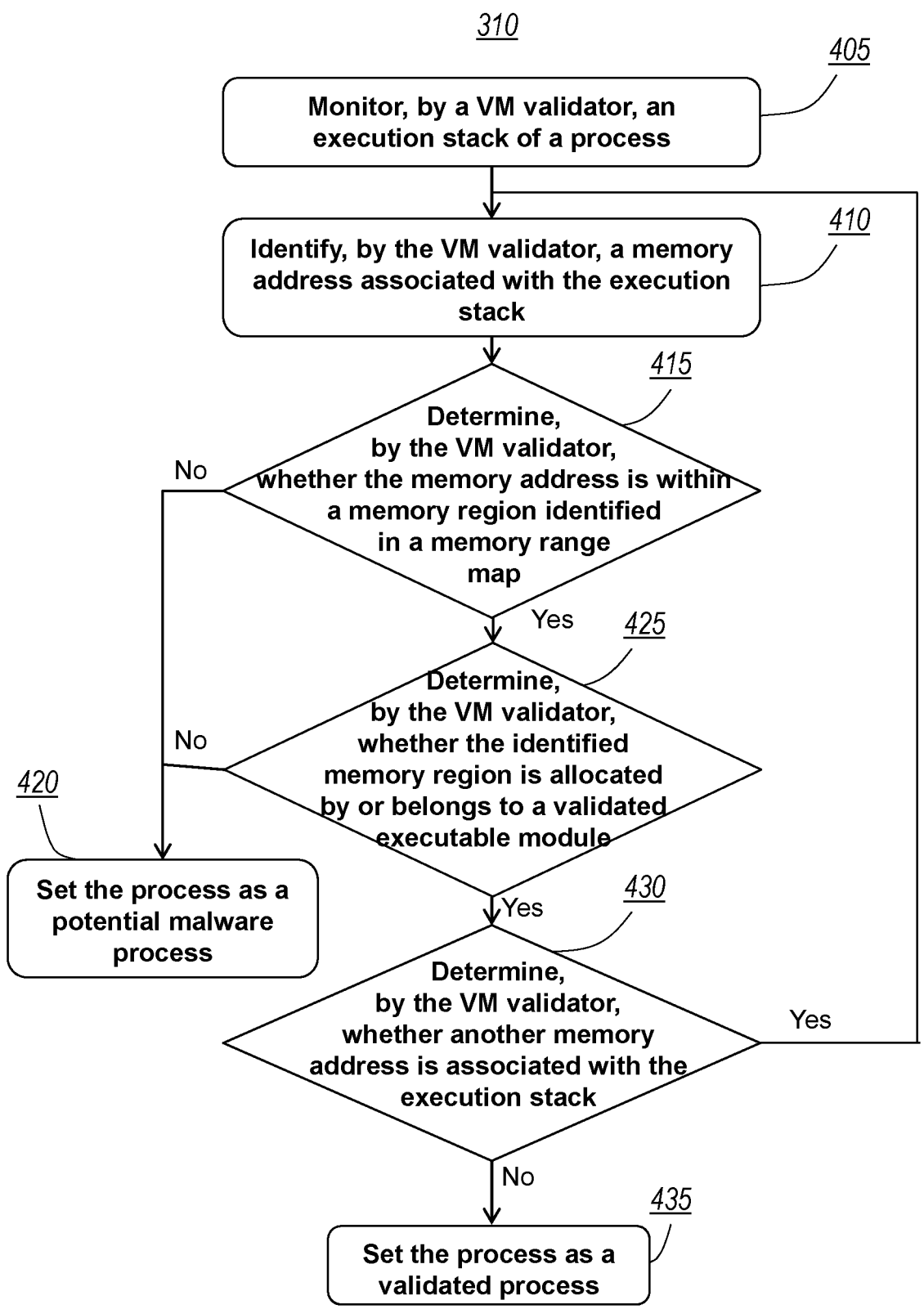
FIG. 4 is an illustrative embodiment of a flow diagram of protecting data or other resources from potential malware.

Referring to FIG. 4, a method 310 for protecting data or other resource from potential or injected malware according to an illustrative embodiment is depicted. The method 310 may include steps or actions 405-435, as shown in FIG. 4. One or more of the steps 405-435 may be used to achieve step 310 in method 300. The method 310 can be performed or executed by the virtual memory (VM) validator 230 and/or the virtual memory validator proxy 235, or any one or more components of system 200A or 200B. In brief overview, the method 310 may include monitoring an execution stack of an executing thread of a process (step 405). The method 310 may include identifying, by a virtual memory validator, a memory address associated with the execution stack (step 410). The method 310 may include determining, by the virtual memory validator, whether the memory address refers to, or is within a memory region or range identified in a memory range map (step 415). The method 310 may include determining, by the virtual memory validator, whether the identified memory region/range is allocated by, or belongs to a validated executable module (step 425). The method 310 may include setting, responsive to determining that the memory address is outside memory ranges of a memory range map or does not correspond to a memory region of a validated executable module, the corresponding process as a potential malware process (step 420). The method 310 may include determining whether another memory address is associated with the execution stack (step 430). The method 310 may include setting, and/or handling (e.g., by the virtual memory validator) the process as a validated process, responsive to determining that no other memory address associated with the execution stack is outside the memory regions of the memory range map (step 435). Steps 410-430 may be repeated by the virtual memory validator 230, if there are other memory addresses associated with the execution stack.

In some embodiments, a virtual memory validator 230 may be injected or loaded into a process. For example, the action examiner 225 may inject the virtual memory validator 230 as a thread or executable module into the process 205 and/or user mode memory space 203. The action examiner 225 may inject the virtual memory validator 230 into each detected process 205 executing in user mode memory space 203. In some embodiments, the action examiner 225 may inject a virtual memory validator 230 into user mode memory space to monitor one or more executing processes and/or any new processes. The virtual memory validator 230 may establish a callback mechanism, such as by hooking an existing function in the process, to be notified of any executable modules loaded into or unloaded from the process 205. In some embodiments, the virtual memory validator 230, the executable load indicator and/or the executable unload indicator, may dynamically track or identify (e.g., via a callback mechanism) executable modules (e.g., DLL's) loaded into or unloaded from the process 205. In some embodiments, the virtual memory validator 230 may poll for changes to the list of currently loaded executable modules. The virtual memory validator 230 may establish a hook to a function that is used to change the protection type of memory, the hook allowing the virtual memory validator 230 to identify one or more regions of a process memory that is designated executable (and/or data) memory. In some embodiments, the virtual memory validator 230 determines the executable modules (e.g., DLL's) currently loaded in the process, e.g., by searching the PEB of the process. The virtual memory validator 230 may establish an entry in a memory range map for every executable module that is already loaded, as discussed above in connection with FIGS. 2A and 2B. The virtual memory validator 230 may establish an entry in the memory range map for the main executable module of the process. The virtual memory validator 230 may start one or more separate execution threads (or optionally uses the current thread) to process each map entry and to validate the corresponding executable module.

Referring to step 405, and in more details, the method 310 may include monitoring or checking, by a virtual memory validator, an execution stack of an executing thread of a process. For example, the virtual memory validator 230 may identify and/or monitor the execution stack(s) of one or more threads 210A-N. Each of the one or more threads 210A-N may include or correspond to an execution stack or call stack that includes one or more actions or subroutines. Each of the one or more threads 210A-N may also correspond to one or more stack frames of the execution stack. The process 205 may take an action to perform an operation (e.g., that accesses a resource), or a malware DLL may initiate such an action. The process 205 may call one or more process components (e.g., executable modules, or threads) to complete the action. If the operation was not started by malware, at some point the malware may still gain control by having hooked an application, a DLL, or a system interface that the process was making use of. The process 205 may attempt to access a protected resource (e.g., data), or use an existing legitimate handle to the resource. A driver 220 operating in kernel mode may detect or intercept an attempt to access the resource. The driver 220 may check, via an action examiner 225 for instance, the corresponding action against one or more validation rules, e.g., to determine if the access attempt is an attempt to access a protected resource. Based on the determination or checking, the action examiner 225 may signal the virtual memory validator 230 to verify the current execution thread or optionally all threads in the process 205. The virtual memory validator 230 may check an execution stack of the current executing thread, and may check the execution stacks of one or more other executing threads of the process 205.

Referring to step 410, and in more details, the method 310 may include identifying, by the virtual memory validator, a memory address or pointer associated with the execution stack. For example, in checking the execution stack of the respective thread 210A-N, the virtual memory validator 230 may identify one or more memory addresses referenced within the execution stack of the respective thread 210A-N. In some embodiments, the virtual memory validator 230, or the executable load indicator and/or the executable unload indicators, may dynamically identify one or more memory addresses or pointers referenced in the execution stack as the corresponding executable module (e.g., DLL) is loaded or unloaded. In some embodiments, the virtual memory validator 230 may update (e.g., optionally) the memory range map responsive to a request from the driver 220 for example, to validate one or more pointers of the execution stack.

Referring to step 415, and in more details, the method 310 may include determining, by the virtual memory validator, whether the memory address or pointer refers to, or is within a memory region or range identified in a memory range map. For example, the virtual memory validator 230 may access the memory range map for a start address of a memory range and/or an end address of the memory range map, to compare with the memory address or pointer. The virtual memory validator 230 may compare the memory address referenced in the execution stack of the thread 210A-N with the start address of the memory range and/or the end address of one or more memory regions identified in the memory range map. The virtual memory validator 230 may determine if the memory address or pointer points to memory that is marked or designated executable. If the memory address or pointer points to executable memory, the virtual memory validator 230 may determine if the memory address or pointer refers to memory within at least one memory region identified in the memory range map. If the memory region is determined to be marked as executable, the virtual memory validator 230 may determine that the memory region is one that belongs to or is allocated by an executable module.

Referring to step 425, and in more details, the method 310 may include determining, by the virtual memory validator, whether the identified memory region corresponds to that of a validated executable module. If the memory address or pointer is not within a range spanning the start address and the end address of any memory range, in the memory range map, the virtual memory validator 230 may determine the corresponding thread to be a potential malware module or component. If the memory address or pointer is not within a range spanning the start address and the end address of any memory range, in the memory range map, the virtual memory validator 230 may determine that the memory address or pointer refers to a memory region allocated by or belonging to an executable module that is not known and/or legitimate. If the memory address or pointer is not within a range spanning the start address and the end address of any memory range, in the memory range map, the virtual memory validator 230 may determine the process to be an unknown or potential malware process (step 420), and may repeat steps 410-430 if for example, there are other memory addresses associated with the execution stack for the one or more threads 210A-N to be verified.

For example, responsive to determining that the memory address from the execution stack of the thread 210A-N is within the range specified by the start address of the memory range and the end address of the memory range, the virtual memory validator 230 may access a validation indicator/Boolean in the memory range map. The validation indicator may indicate whether the start address of the memory range and/or the end address of the memory range corresponds to those of a validated executable module. The value of the validator indicator may be set based on a prior verification by the virtual memory validator for instance. If the memory address associated with the execution stack for the respective thread 210A-N does not correspond to that of a validated module, the virtual memory validator 230 may determine the process to be an unknown or a potential malware process (step 420), and may repeat operations 410-430 if there are more memory addresses associated with the execution stack for the respective thread 210A-N. For example, the virtual memory validator may walk or check the execution stack for any additional pointers, starting from the bottom or top of the stack.

Referring to step 430, and in more details, the method 310 may include determining, by a virtual memory validator, whether another memory address is associated with the execution stack. For example, the virtual memory validator 230 may determine whether there are any other memory addresses referenced in the execution stack of the respective thread 210A-N. The virtual memory validator 230 may also set a counter for the number of discrete memory addresses pointed at, accessed, used or referenced by the thread 210A-N. Responsive to determining that there are no other memory addresses or pointers in the stack to check, the virtual memory validator 230 may repeat steps 410-430 to check the stack of another thread. Responsive to determining that there are no other memory addresses associated with the execution stack(s), the virtual memory validator 230 may determine the process to be a validated process (step 435).

Referring to step 315 with respect to FIG. 3, and in more details, the method 300 may further include determining, by a virtual memory validator, responsive to determining whether the process is allowed to access a protected resource, whether to block access by the process to the protected resource. For example, if the virtual memory validator 230 has set the process 205 to be a potential malware process, the virtual memory validator 230 may block access by the process 205 to the protected resource accessible in kernel mode 203. The virtual memory validator 230 may also relay or signal to a rule system or rule engine of the action examiner 225, information identifying the process 205 or the executing thread 210A-N as a potential malware process. In response, the rule system or rule engine of the action examiner 225 may suspend the executing thread 210A-N of the process 205, responsive to the virtual memory validator 230 identifying that the process 205 or the respective executing thread 210A-N is a potential malware process. If the virtual memory validator 230 has set the process 205 as a validated process, the virtual memory validator 230 may allow access by the process 205 to access the protected resource. Thus, in contrast to conventional whitelist mechanisms, the method 300 may allow at least some of the threads 210A-N of the process 205 to run and complete their operation without terminating the entire process 205. For instance, certain actions of a thread (e.g., to access a protected resource may be blocked or denied, but the thread is allowed to continue to execute in the user mode 201 and perform other operations.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of validating processes, the method comprising:
    monitoring, by a virtual memory validator injected into a process executing in a user mode memory space on a computing device, an execution stack of an executing thread of the process;
    identifying, by the virtual memory validator in the user mode memory space, a memory address referenced in the execution stack, responsive to the process in the user mode memory space attempting to access a protected resource in a kernel mode memory space;
    determining, by the virtual memory validator, that the memory address attempted to be accessed from the user mode memory space refers to a memory region that is yet to be designated as executable in the kernel mode memory space;
    determining, by the virtual memory validator, that the memory address is within memory regions identified in a memory range map that specifies memory addresses for a plurality of validated processes including the process; and
    identifying, by the virtual memory validator responsive to the determination that the memory address refers to the memory region that is yet to be designated as executable in the kernel mode memory space and to the determination that the memory address is within the memory regions identified in the memory range map, the process as a validated process.

2. The method of claim 1, further comprising determining, by the virtual memory validator, that another memory address is not associated with the execution stack of the executing thread of the process besides the memory address; and
    wherein identifying the process as the validated process further comprises identifying the process as the validated process responsive to the determination that the another memory address is not associated with the execution stack besides the memory address.

3. The method of claim 1, wherein determining that the memory address refers to the memory region yet to be designated as executable further comprises determining that the memory address attempted to be accessed from the user mode memory space refers to a memory region allocated to data.

4. The method of claim 1, wherein determining that the memory address refers to the memory region yet to be designated as executable further comprises using a virtual protect function to identify the memory region as yet to be designated as executable.

5. The method of claim 1, wherein determining that the memory address is within the memory regions identified in the memory range map further comprises determining that the memory address corresponds to at least one entry of a plurality of entries in the memory range map, each of the plurality of entries identifying a memory address allocated to at least one of the plurality of validated processes.

6. The method of claim 1, wherein identifying the memory address further comprises traversing a plurality of memory addresses of the execution stack of the executing thread to identify the memory address referenced in the execution stack.

7. The method of claim 1, further comprising interfacing, by the virtual memory validator, with a virtual memory validator proxy executing in the user mode memory space on the computing device to invoke the virtual memory validator proxy to present information via the computing device.

8. The method of claim 1, further comprising establishing, by the virtual memory validator, an executable load indicator to monitor one or more function calls of the executing thread of the process, responsive to injection of the virtual memory validator into the process, and to identify the memory address attempted to be accessed by the process.

9. The method of claim 1, further comprising providing, by a driver executing in the kernel mode memory space, an indication that the process from the user mode memory space is attempting to access the protected resource in the kernel mode memory space.

10. The method of claim 1, further comprising permitting, by an action examiner executing in the kernel mode memory space, at least the executing thread of the process to access to the protected resource responsive to identifying the process as the validated process.

11. A system for validating processes, the system comprising:
    memory space on a computing device, comprising a user mode memory space and a kernel mode memory space; and
    a virtual memory validator injected into a process executable in the user mode memory space, the virtual memory validator configured to:
        monitor an execution stack of an executing thread of the process executing in the user mode memory space;

identify a memory address referenced in the execution stack, responsive to the process from the user mode memory space attempting to access a protected resource of the kernel mode memory space;

determine that the memory address refers to a memory region attempted to be accessed from the user mode memory space that is yet to be designated as executable in the kernel mode memory space;

determine that the memory address is within memory regions identified in a memory range map that specifies memory addresses for a plurality of validated processes including the process; and identify, responsive to the determination that the memory address refers to the memory region that is yet to be designated as executable in the kernel mode memory space or to the determination that the memory address is within the memory regions identified in the memory range map, the process as a validated process.

12. The system of claim 11, wherein the virtual memory validator is further configured to:

determine that another memory address is not associated with the execution stack of the executing thread of the process besides the memory address; and identify the process as the validated process responsive to the determination that the another memory address is not associated with the execution stack besides the memory address.

13. The system of claim 11, wherein the virtual memory validator is further configured to determine that the memory address attempted to be accessed from the user mode memory space, refers to a memory region allocated to data.

14. The system of claim 11, wherein the virtual memory validator is further configured to use a virtual protect function to identify the memory region as yet to be designated as executable.

15. The system of claim 11, wherein the virtual memory validator is further configured to determine that the memory address corresponds to at least one entry of a plurality of entries in the memory range map, each of the plurality of entries identifying a memory address allocated to at least one of the plurality of validated processes.

16. The system of claim 11, wherein the virtual memory validator is further configured to traverse a plurality of memory addresses of the execution stack of the executing thread to identify the memory address referenced in the execution stack.

17. The system of claim 11, wherein the virtual memory validator is further configured to interface, with a virtual memory validator proxy executing in the user mode memory space on the computing device to invoke the virtual memory validator proxy to present information via the computing device.

18. The system of claim 11, wherein the virtual memory validator is further configured to establish an executable load indicator to monitor one or more function calls of the executing thread of the process, responsive to injection of the virtual memory validator into the process, and to identify the memory address attempted to be accessed by the process.

19. The system of claim 11, further comprising a driver executable in the kernel mode memory space configured to provide an indication that the process from the user mode memory space is attempting to access the protected resource in the kernel mode memory space.

20. The system of claim 11, further comprising an action examiner executable in the kernel mode memory space, configured to permit at least the executing thread of the process to access to the protected resource responsive to identifying the process as the validated process.

* * * * *